United States Patent [19]

Drent

[11] Patent Number: 4,889,913

[45] Date of Patent: Dec. 26, 1989

[54] POLYMERIZATION OF OLEFIN/CO MIXTURE WITH CATALYST COMPOSITION COMPRISING PHENOLIC COMPOUND

[75] Inventor: Eit Drent, Amsterdam, Netherlands

[73] Assignee: Shell Oil Company, Houston, Tex.

[21] Appl. No.: 247,834

[22] Filed: Sep. 22, 1988

[30] Foreign Application Priority Data

Sep. 29, 1987 [NL] Netherlands ............... 8702317

[51] Int. Cl.$^4$ ............................................. C08G 67/02
[52] U.S. Cl. ..................................... 528/392; 502/154
[58] Field of Search ........................................ 528/392

[56] References Cited

U.S. PATENT DOCUMENTS

| | | | |
|---|---|---|---|
| 2,495,286 | 1/1950 | Brubaker | 260/63 |
| 3,689,460 | 5/1972 | Nozaki | 260/63 CQ |
| 3,694,412 | 9/1972 | Nozaki | 260/63 CQ |
| 3,835,123 | 9/1974 | Nozaki | 260/949 B |
| 3,984,388 | 10/1976 | Shryne et al. | 260/63 CQ |
| 4,788,279 | 11/1988 | Drent | 528/392 |
| 4,794,165 | 12/1988 | Van Doorn et al. | 528/392 |
| 4,810,774 | 3/1989 | Drent | 528/392 |
| 4,820,802 | 4/1989 | Drent et al. | 528/392 |
| 4,824,934 | 4/1989 | Van Broekhoven et al. | 528/392 |
| 4,824,935 | 4/1989 | Van Broekhoven et al. | 528/392 |
| 4,831,113 | 5/1989 | Van Broekhoven et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 219906 | 4/1987 | European Pat. Off. . |
| 222454 | 5/1987 | European Pat. Off. . |
| 248483 | 12/1987 | European Pat. Off. . |
| 257663 | 3/1988 | European Pat. Off. . |
| 1081304 | 8/1967 | United Kingdom . |

*Primary Examiner*—Harold D. Anderson
*Attorney, Agent, or Firm*—Dean F. Vance

[57] ABSTRACT

The present patent application relates to a process for copolymerizing a mixture of carbon monoxide and at least one olefinically unsaturated compound with catalyst compositions comprising:
(a) a palladium compound,
(b) an anion of an acid with a $pK_a$ of less than 4,
(c) a triaryl arsine, and
(d) a compound containing at least one phenolic hydroxyl group.

7 Claims, No Drawings

POLYMERIZATION OF OLEFIN/CO MIXTURE WITH CATALYST COMPOSITION COMPRISING PHENOLIC COMPOUND

FIELD OF THE INVENTION

The invention relates to new compositions which are suitable for application as catalysts in the preparation of polymers of carbon monoxide with one or more olefinically unsaturated compounds.

BACKGROUND OF THE INVENTION

High molecular weight linear polymers of carbon monoxide with one or more olefinically unsaturated compounds (indicated as A for short) in which the monomer units occur alternately and which therefore consist of units with the general formula —(CO)—A'—, in which A' represent a monomer unit originating from an applied monomer A, can be prepared under the application of catalyst compositions on the basis of:
(a) a palladium compound,
(b) an anion of an acid with a $pK_a$ of less than 4, and
(c) triphenyl phosphine, arsine or stibine.

A drawback of these catalyst compositions is their low polymerization activity.

In the course of an investigation recently carried out by the applicant, it was found that the polymerization activity of catalyst compositions containing a phosphine as component (c) can be substantially improved by introducing a substituent into the phenyl groups at an ortho position relative to phosphorus. Catalyst compositions containing, for example tri(2-methyl phenyl) phosphine or tri(2-methoxyphenyl) phosphine as component (c) exhibited a considerably higher polymerization activity than corresponding catalyst compositions containing triphenyl phosphine as component (c).

Further research by the applicant into the aforementioned catalyst compositions has now revealed that the polymerization activity of catalyst compositions containing a triaryl arsine as component (c) can be greatly improved by including in the composition as component (d) a compound which contains at least one phenolic hydroxyl group. The increase in polymerization activity attainable in this way is as a rule considerably higher than that which can be achieved with the phosphine containing catalyst compositions by the application of the aforementioned ortho substitution. This discovery is surprising in view of the following. Including a phenolic hydroxyl compound as component (d) in the aforementioned catalyst compositions containing a triaryl stibine as component (c) has no noticeable affect on the polymerization activity. Inclusion of a phenolic hydroxyl compound as component (d) in a catalyst composition containing a triaryl phosphine as component (c) results in the complete loss of the composition's polymerization activity.

SUMMARY OF THE INVENTION

The present patent application relates to catalyst compositions comprising:
(a) a palladium compound,
(b) an anion of an acid with a $pK_a$ of less than 4,
(c) a triaryl arsine, and
(d) a compound containing at least one phenolic hydroxyl group.

The patent application further relates to the application of these catalyst compositions to the preparation of polymers of carbon monoxide with one or more olefinically unsaturated compounds as well as to the polymers thus prepared and to shaped objects consisting at least partly of these polymers.

DESCRIPTION OF THE PREFERRED EMBODIMENTS

The palladium compound used as component (a) is preferably a palladium salt of a carboxylic acid and in particular palladium acetate. Some examples of appropriate acids with a $pK_a$ of less than 4 (measured in aqueous solution at 18° C.), whose anion should be present in the catalyst compositions as component (b), are mineral acids such as perchloric acid, sulfuric acid, phosphoric acid and nitrous acid, sulfonic acids such as 2-hydroxypropane 2-sulfonic acid, para-toluene sulfonic acid, methane sulfonic acid and trifluoromethane sulfonic acid and carboxylic acids such as trifluoroacetic acid, trichloroacetic acid, dichloroacetic acid, difluoroacetic acid, tartaric acid and 2,5-dihydroxybenzoic acid. Preferably, the catalyst composition contains as component (b) an anion of an acid with a $pK_a$ of less than about 2 and, in particular, an anion of a sulfonic acid such as para-toluene sulfonic acid or an anion of a carboxylic acid such as trifluoroacetic acid. Component (b) is preferably present in the catalyst compositions in a quantity of about 0.5 to about 200 and in particular about 1.0 to about 100 equivalents per gram atom palladium. Component (b) may be incorporated in the catalyst compositions in the form of an acid or in the form of a salt. Possible salts are non-noble transition metal salts. If component (b) is applied as a salt of a non-noble transition metal, preference is given to a copper salt. If desired, components (a) and (b) can be combined in a single compound. An example of such a compound is palladium para-tosylate.

As component (c) in the catalyst compositions according to the invention, triphenyl arsines are preferably used in which each of the phenyl groups may contain one or more substituents. These substituents may be either polar or non-polar. Examples of polar substituents are alkoxy groups such as methoxy, ethoxy and propoxy groups and halogens such as chlorine and bromine. Examples of non-polar substituents are hydrocarbyl groups such as methyl, ethyl and propyl groups. If desired, the phenyl groups may contain a plurality of substituents such as two hydrocarbyl groups, one of which is at the second position and the other at the third position relative to phosphorus. Both hydrocarbyl groups can together form part of a cyclic structure. The 1-naphthyl group can be considered as representative of this class. Preferably, a triaryl arsine with three identical aryl groups is used as component (c). Particular preference is given to the use of triphenyl arsine as component (c). Component (c) is preferably present in the catalyst compositions in a quantity of about 0.1–100 and in particular about 0.5–50 moles per mol palladium compound.

As component (d) in the catalyst compositions according to the invention, a compound should be used which contains at least one phenolic hydroxyl group. Examples of appropriate phenolic hydroxyl compounds are phenol and substituted phenols such as cresols, xylols, alkoxyphenols and halogenophenols. If desired, the compounds used as component (d) may contain a plurablity of phenolic hydroxyl groups per molecule. Examples of such compounds are catechol, resorcinol, hydroquinone and pyrogallol. Preferably, a compound is used as component (d) in the catalyst compositions which contains just one phenolic hydroxyl group. Particular preference is given to the use of phenol as component (d). Component (d) is preferably present in the catalyst compositions in a quantity of about 50–10,000 and in particular about 100–1000 moles per gram atom palladium.

In order to increase the activity of the present catalyst compositions, a 1,4-quinone is preferably included as component (e). 1,4-benzoquinone and 1,4-naphthoquinone are very suitable as activity promoters. The quantity of 1,4-quinone used is preferably about 10–1000 moles and in particular about 25–250 moles per gram atom palladium.

The polymerization under application of the catalyst compositions according to the invention is preferably carried out by contacting the monomers with a solution of the catalyst composition in an aprotic diluent in which the polymers are almost or entirely insoluble. During the polymerization, the polymers are obtained in the form of a suspension in the diluent. Examples of suitable aprotic diluents are hydrocarbons such as toluene, ethers such as anisole and the dimethyl ether of diethylene glycol, ketones such as acetone and esters such as ethyl acetate. The polymerization can take place either batchwise or continuously. If desired, the polymerization can also be carried out in the gas phase.

Olefinically unsaturated organic compounds which can be polymerized with carbon monoxide with the aid of catalyst compositions according to the invention may be compounds consisting solely of carbon and hydrogen or compounds comprising one or more hetero atoms in addition to carbon and hydrogen. The catalyst compositions according to the invention are preferably applied for the preparation of polymers of carbon monoxide with one or more olefinically unsaturated hydrocarbons. Examples of appropriate hydrocarbon monomers are ethylene and other α-olefins such as propene, butene-1, hexene-1 and octene-1, as well as styrenes and alkyl substituted styrenes such as p-methyl stryene and p-ethyl styrene. The catalyst compositions according to the invention are particularly suitable for application in the preparation of copolymers of carbon monoxide with ethylene and in the preparation of terpolymers of carbon monoxide with ethylene and another olefinically unsaturated hydrocarbon, in particular propene.

The quantity of catalyst compositions applied in the preparation of the polymers can vary within wide limits. The quantity of catalyst per mol olefinically unsaturated compound to be polymerized preferably contains about $10^{-7}$ to about $10^{-3}$ and in particular about $10^{-6}$ to about $10^{-4}$ gram atom palladium.

The preparation of the polymers is preferably carried out at a temperature of about 20°–200° C. and a pressure of about 1–200 bar and in particular, at a temperature of about 30°–150° C. and a pressure of about 20–100 bar. The molar ratio of the olefinically unsaturated compounds relative to carbon monoxide in the mixture to be polymerized is preferably about 10:1–1:5 and in particular about 5:1–1:2. The carbon monoxide used in the preparation of the polymers according to the invention does not need to be pure. It may contain impurities such as oxygen, carbon dioxide and nitrogen.

The invention will now be illustrated with reference to the following examples which are not intended to be construed as limiting the invention.

EXAMPLE 1

A carbon monoxide/ethylene copolymer was prepared as follows. A catalyst solution consisting of 50 ml methanol, 0.1 mmol palladium acetate, 2.0 mmol para-toluene sulfonic acid, and 0.3 mmol triphenyl phosphine was introduced into a magnetically stirred autoclave with a volume of 250 ml.

After the air present in the autoclave has been removed by evacuation, ethylene was forced into it until a pressure of 30 bar was reached, followed by carbon monoxide until a pressure of 60 bar was reached. The contents of the autoclave was then brought to 105° C. Polymerization was ended after 5 hours by cooling to room temperature and then releasing the pressure. The polymer formed was filtered off, washing with methanol and dried under vacuum at room temperature.

The polymerization velocity was less than 5 g copolymer/g palladium/hour.

EXAMPLE 2

A carbon monoxide/ethylene copolymer was prepared in a virtually analogous manner as the copolymer in Example 1, but with the following differences:

(a) the catalyst solution contained 1.0 mmol para-toluene sulfonic acid instead of 2 mmol and 0.15 mmol tri(2-methylphenyl) phosphine instead of 0.3 mmol triphenyl phosphine, and (b) the reaction temperature was 80° C. instead of 105° C.

The polymerization velocity was 20 g copolymer/g palladium/hour.

EXAMPLE 3

A carbon monoxide/ethylene copolymer was prepared in a virtually analogous manner as the copolymer in Example 1, but with the difference that the catalyst solution contained 1.0 mmol para-toluene sulfonic acid instead of 2 mmol and 0.3 mmol tri(2-methoxy phenyl) phosphine instead of 0.3 mmol triphenyl phosphine.

The polymerization velocity was 20 g copolymer/g palladium/hour.

EXAMPLE 4

A carbon monoxide/ethylene copolymer was prepared in a virtually analogous manner as the copolymer in Example 1, but with the following differences:

(a) the catalyst solution contained 40 ml anisole instead of 50 ml methanol and 5 mmol triphenyl phosphine instead of 0.3 mmol, (b) ethylene was forced into the autoclave until a pressure of 20 bar was reached, following by carbon monoxide until a pressure of 50 bar was reached, (c) the reaction temperature was 100° C. instead of 105° C., and (d) the reaction time was 2 hours instead of 5 hours.

The polymerization velocity was less than 5 g copolymer/g palladium/hour.

EXAMPLE 5

A carbon monoxide/ethylene copolymer was prepared in a virtually analogous manner as the copolymer in Example 1, but with the following differences:

(a) the catalyst solution contained 40 ml anisole instead of 50 ml methanol and 5 mmol triphenyl arsine instead of 0.3 mmol triphenyl phosphine, (b) ethylene was forced into the autoclave until a pressure of 20 bar was reached, followed by carbon monoxide until a pressure of 50 bar was reached, and (c) the reaction temperature was 85° C. instead of 105° C.

The polymerization velocity was less than 5 g copolymer/g palladium/hour.

EXAMPLE 6

A carbon monoxide/ethylene copolymer was prepared in a virtually analogous manner as the copolymer in Example 1, but with the following differences:

(a) the catalyst solution contained 40 ml anisole instead of 50 ml methanol and 5 mmol triphenyl stibine instead of 0.3 mmol triphenyl phosphine, (b) ethylene was forced into the autoclave until a pressure of 20 bar was reached, followed by carbon monoxide until a pressure of 50 bar was reached, (c) the reaction temperature was 85° C. instead of 105° C.

The polymerization velocity was less than 5 g copolymer/g palladium/hour.

EXAMPLE 7

A carbon monoxide/ethylene copolymer was prepared in a virtually analogous manners as the copolymer in Example 1, but with the following differences:

(a) the catalyst solution containing 40 ml anisole instead of 50 ml methanol and 5 mmol triphenyl arsine instead of 0.3 mmol triphenyl phosphine and additionally 10 g phenol, (b) ethylene was forced into the autoclave until a pressure of 20 bar was reached, followed by carbon monoxide until a pressure of 50 bar was reached, (c) the reaction temperature was 100° C. instead of 105° C., and (d) the reaction time was ½ hour instead of 5 hours.

The polymerization velocity was 780 g copolymer/g palladium/hour.

EXAMPLE 9

A carbon monoxide/ethylene copolymer was prepared in a virtually analogous manner as the copolymer in Example 1, but with the following differences:

(a) the catalyst solution contained 40 ml anisole instead of 50 ml methanol, 5 mmol triphenyl stibine instead of 0.3 mmol triphenyl phosphine and additionally 3 g phenol, (b) ethylene was forced into the autoclave until a pressure of 20 bar was reached, followed by carbon monoxide until a pressure of 50 bar was reached, and (c) the reaction temperature was 85° C. instead of 105° C.

The polymerization velocity was less than 5 g copolymer/g palladium/hour.

EXAMPLE 10

A carbon monoxide/ethylene copolymer was prepared in a virtually analogous manner as the copolymer in Example 1, but with the following differences:

(a) the catalyst solution contained 40 ml anisole instead of 50 ml methanol, 5 mmol triphenyl arsine instead of 0.3 mmol triphenyl phosphine and additionally 3 g phenol, (b) ethylene was forced into the autoclave until a pressure of 20 bar was reached, followed by carbon monoxide until a pressure of 50 bar was reached, (c) the reaction temperature was 85° C. instead of 105° C., and (d) the reaction time was 2½ hours instead of 5 hours.

The polymerization velocity was 190 g copolymer/g palladium/hour.

EXAMPLE 11

A carbon monoxide/ethylene copolymer was prepared in a virtually analogous manner as the copolymer in Example 1, but with the following differences:

(a) the catalyst solution contained 50 ml toluene instead of 50 ml methanol, 5 mmol triphenyl arsine instead of 0.3 mmol triphenyl phosphine and additionally 3 g phenol, (b) ethylene was forced into the autoclave until a pressure of 20 bar was reached, followed by carbon monoxide until a pressure of 50 bar was reached, (c) the reaction temperature was 85° C. instead of 105° C., and (d) the reaction time was 2½ hours instead of 5 hours.

The polymerization velocity was 260 g copolymer/g palladium/hour.

EXAMPLE 12

A carbon monoxide/ethylene copolymer was prepared in a virtually analogous manner as the copolymer in Example 1, but with the following differences:

(a) the catalyst solution contained 50 ml dimethyl ether of diethylene glycol instead of 50 ml methanol, 5 mmol triphenyl arsine instead of 0.3 mmol triphenyl phosphine and additionally 3 g phenol, (b) ethylene was forced into the autoclave until a pressure of 20 bar was reached, followed by carbon monoxide until a pressure of 50 bar was reached, (c) the reaction temperature was 85° C. instead of 105° C., and The polymerization velocity was 260 g copolymer/g palladium/hour.

With the aid of $^{13}C$ NMR analysis, it was established that the carbon monoxide/ethylene copolymers prepared according to examples 1–6 and 8–12 possessed a linear alternating structure and that they therefore consisted of units with the formula $-(CO)-(C_2H_4)-$.

Of examples 1–12, Examples 8 and 10–12 are in accordance with the invention. In these examples, catalyst compositions according to the invention were used which contained both a triaryl arsine and a phenolic hydroxyl compound. Examples 1–7 and 9 fall outside the scope of the invention, but are included in the patent application for the purpose of comparison.

Comparison of Example 1 (carried out at 105° C. with a catalyst composition containing an unsubstituted triphenyl phosphine as component (c)) with Examples 2 and 3 (carried out at temperatures of 80°–105° C. with catalyst compositions containing an ortho-substituted triphenyl phosphine as component (c)), showed that higher polymerization velocities are obtained with the latter catalyst compositions at equal or lower temperatures. Comparison of Example 5 (carried out with a catalyst composition containing triphenyl arsine as component (c)) with Examples 8 and 10–12 (carried out with catalyst compositions according to the invention containing triphenyl arsine as component (c) and additionally phenol as component (d)) demonstrates the sharp increase in polymerization velocity achieved by incorporating a phenolic hydroxyl compound in these catalyst compositions. This increase is considerably greater than that which could be achieved by ortho substitution in triphenyl phosphine. Comparison of Example 6 (carried out with a catalyst composition containing triphenyl stibine as component (c)) with Example 9 (carried out with a catalyst composition containing triphenyl stibine as component (c) and additionally phenol as component (d)) and comparison of Example 4 (carried out with a catalyst composition containing triphenyl phosphine as component (c)) with Example 7 (carried out with a catalyst composition containing triphenyl phosphine as component (c) and additionally phenol as component (d)) clearly demonstrates the selective effect of the inclusion of a phenolic hydroxyl compound in the present catalyst compositions. In contrast with triaryl arsine-containing catalyst compositions, in which this inclusion leads to a sharp increase in polymerization activity, comparison with Examples 4, 6, 7 and 9 shows that this inclusion in triaryl stibine containing catalyst compositions produces no improvement in polymerization activity, while in the case of triaryl phosphine containing catalyst compositions this inclusion results in a complete loss of polymerization activity.

What is claimed is:

1. A process for the preparation of polymers which comprises polymerizing a mixture of carbon monoxide with at least one olefinically unsaturated compound with a catalyst composition comprising:
    (a) a palladium compound,
    (b) an anion of an acid with a $pK_a$ of less than about 4,
    (c) a triaryl arsine, and
    (d) a compound containing at least one phenolic hydroxyl group.

2. The process of claim 1 wherein said process is carried out by contacting said mixture of carbon monoxide and at least one olefinically unsaturated compound with a solution of said catalyst composition in an aprotic diluent in which said mixture of carbon monoxide and at least one olefinically unsaturated compound is insoluble.

3. The process of claim 1 wherein said olefinically unsaturated compound is selected from the group consisting of a hydrocarbon and a mixture of a hydrocarbon and another olefinically unsaturated compound.

4. The process of claim 3 wherein said hydrocarbon is ethylene and said olefinically unsaturated compound is propene.

5. The process of claim 1 wherein said process is carried out at a temperature of about 30°–150° C., a pressure of about 20–200 bar and a molar ratio of said olefinically unsaturated compound to carbon monoxide in the mixture to be polymerized of about 5:1–1:2, and wherein the catalyst composition contains about $10^{-6}$ to about $10^{-4}$ gram atom palladium per mol olefinically unsaturated compound.

6. The process of claim 1 wherein said compound containing at least one phenolic hydroxyl group is phenol.

7. The process of claim 5 wherein said palladium compound is palladium acetate, said acid is trifluoroacetic acid, said triaryl arsine is triphenyl arsine and said compound contaning at least one phenolic hydroxyl group is phenol.

* * * * *